United States Patent
Otani

(10) Patent No.: US 7,555,433 B2
(45) Date of Patent: Jun. 30, 2009

(54) VOICE GENERATOR, METHOD FOR GENERATING VOICE, AND NAVIGATION APPARATUS

(75) Inventor: Michiaki Otani, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 763 days.

(21) Appl. No.: 10/615,585

(22) Filed: Jul. 7, 2003

(65) Prior Publication Data
US 2004/0098248 A1 May 20, 2004

(30) Foreign Application Priority Data
Jul. 22, 2002 (JP) ............................. 2002-212057

(51) Int. Cl.
*G10L 21/00* (2006.01)
(52) U.S. Cl. .................. 704/277; 704/258; 704/266; 704/2; 704/5
(58) Field of Classification Search .............. 704/277, 704/258, 266, 2, 5
See application file for complete search history.

(56) References Cited

U.S. PATENT DOCUMENTS

| | | | |
|---|---|---|---|
| 5,774,854 A | | 6/1998 | Sharman |
| 5,913,193 A | * | 6/1999 | Huang et al. ................. 704/258 |
| 6,024,571 A | * | 2/2000 | Renegar ...................... 434/157 |
| 6,173,263 B1 | * | 1/2001 | Conkie ........................ 704/260 |
| 6,275,789 B1 | * | 8/2001 | Moser et al. ................... 704/7 |
| 6,385,586 B1 | | 5/2002 | Dietz |
| 6,389,386 B1 | * | 5/2002 | Hetherington et al. ......... 704/8 |
| 6,460,015 B1 | * | 10/2002 | Hetherington et al. ......... 704/8 |
| 6,934,756 B2 | * | 8/2005 | Maes .......................... 709/227 |
| 7,099,876 B1 | * | 8/2006 | Hetherington et al. ...... 707/100 |
| 2002/0198719 A1 | * | 12/2002 | Gergic et al. ............. 704/270.1 |
| 2003/0200079 A1 | * | 10/2003 | Sakai ............................ 704/8 |

FOREIGN PATENT DOCUMENTS

JP 09-244679 9/1997

* cited by examiner

*Primary Examiner*—Qi Han
(74) *Attorney, Agent, or Firm*—Brinks Hofer Gilson & Lione

(57) ABSTRACT

A main controller feeds a spelling translator with a text item representing a place name stored in a map database. The spelling translator translates the spelling of the text item according to rules described in a translation rule table. The spelling translator translates, e.g., a French character or string included in the text item and not included in the English alphabet into an English alphabet character or string having a pronunciation equivalent or similar to the pronunciation of the French character or string. The translated text item is fed into a TTS engine for English. The TTS engine converts the text item into voice, which is output from a speaker.

18 Claims, 5 Drawing Sheets

FIG. 4A

[FRENCH CHARACTERS]

| BEFORE TRANSLATION | AFTER TRANSLATION |
|---|---|
| è | e |
| é | e |
| à | a |
| ù | u |
| ç | s |
| ô | o |
| î | i |
| ê | e |
| â | a |
| û | u |
| Ç | S |
| À | A |
| È | E |
| É | E |
| Ô | O |
| Ö | O |
| Ë | E |
| Ä | A |
| Ü | U |
| Ï | I |
| D' | D |
| L' | LA |

FIG. 4B

[GERMAN CHARACTERS]

| BEFORE TRANSLATION | AFTER TRANSLATION |
|---|---|
| ä | ae |
| ü | ue |
| ö | oe |
| ß | ss |

FIG. 4C

[ABBREVIATED TEXT ITEM]

| BEFORE TRANSLATION | FULL TEXT ITEM | AFTER TRANSLATION |
|---|---|---|
| ABEY | ABBEY | ABBEY |
| ACC | ACCESS | ACCESS |
| ACRS | ACRES | ACRES |
| AL | ALLEÉ | ALEE |
| ALCV | ALCOVE | ALCOVE |
| ALDA | ALLEÉ DE LA | ALLEE DE LA |
| ARDL | AOUTOROUTE DE L' | AOUTOROUTE DE LA |
| AVD | AVENUE D' | AVENUE D |
| COT | CÔTE | COTE |
| COTE | CÔTE DE | COTE DE |
| COTU | CÔTE DU | COTE DU |

VOICE GENERATOR, METHOD FOR GENERATING VOICE, AND NAVIGATION APPARATUS

BACKGROUND

1. Field of the Invention

The present invention relates to a voice generator for generating voice corresponding to a text item and, particularly, to a multilingual processing technique for the voice generator.

2. Description of the Related Art

Japanese Unexamined Patent Application Publication No. 8-30287 or 8-95597 discloses a text-to-speech (TTS) engine, which is known as a technique for voice generators to generate voice corresponding to text items.

To process multiple languages, the TTS engine stores processes and data for the conversion of a text item to voice, which are prepared for each language, and switches the processes and data according to the language of the text item, thereby generating voice corresponding to the language.

Unfortunately, the conversion with the use of the processes and data for each language requires a larger-scale resource and a complicated process.

SUMMARY OF THE INVENTION

Accordingly, an object of the present invention is to provide a simplified process for converting multilingual text items into voice.

To accomplish the object, the present invention provides a voice generator for generating voice corresponding to a text item according to a first aspect. The voice generator includes a unit for translating an original text item to be converted into voice into a new text item by replacing a first language character or string included in the original text item and not included in a second language with a second language character or string having a pronunciation equivalent or similar to the pronunciation of the first language character or string; and a unit for generating voice by pronouncing the new text item according to the pronunciation of the second language.

The voice generator can generate voice corresponding to either language text items with the unit for generating voice, although the unit for generating voice supports only the second language. That is, either language text items can be converted into voice with a TTS engine that only supports the second language, leading to the simplification of the component and its process.

Furthermore, the present invention provides a voice generator for generating voice corresponding to a text item according to a second aspect. The voice generator includes a unit for translating an abbreviated original text item to be converted into voice into a new text item by replacing a first language character or string included in a full original text item and not included in a second language with a second language character or string having a pronunciation equivalent or similar to the pronunciation of the first language character or string; and a unit for generating voice by pronouncing the new text item according to the pronunciation of the second language.

The voice generator can convert the abbreviated first language text item into voice with the unit for generating voice, although the unit for generating voice supports only the second language. That is, the abbreviated first language item and the second language text item can be converted into voice with a TTS engine that only supports the second language, leading to the simplification of the component and its process.

The voice generator can be applied, for example, to a navigation apparatus to generate voice corresponding to a place name in text format. The application can hold down an increase in the scale and complexity of the process in navigation apparatuses used in countries and regions having place names in multiple languages.

BRIEF DESCRIPTION OF THE DRAWINGS

FIGS. 4A, 4B, and 4C are illustrations of the contents of a translation rule table according to the embodiment of the present invention.

DESCRIPTION OF THE PREFERRED EMBODIMENTS

The present invention will now be described with reference to an embodiment applied to a navigation apparatus for North American users.

Figure 1:
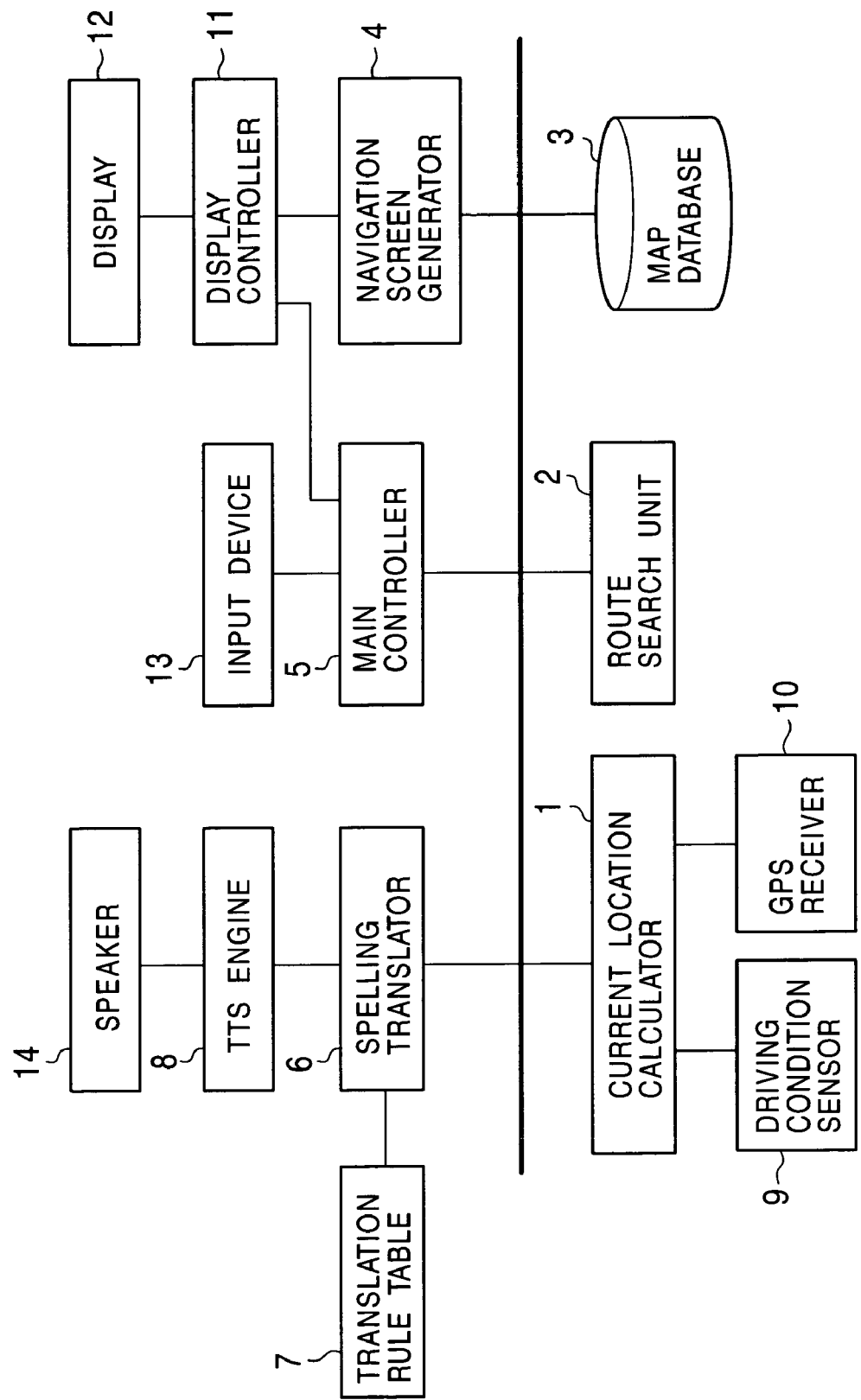
FIG. 1 is a block diagram showing the configuration of a navigation apparatus according to an embodiment of the present invention.

FIG. 1 shows the configuration of a navigation apparatus according to the present embodiment. The navigation apparatus has a current location calculator 1, a route search unit 2, a map database 3, a navigation screen generator 4, a main controller 5, a spelling translator 6, a translation rule table 7, a TTS engine 8 for English, a driving condition sensor 9 for detecting the driving condition of a vehicle, such as an angular acceleration sensor or a speed sensor, a GPS receiver 10, a display controller 11, a display 12, an input device 13 for receiving input from users, such as a remote control, and a speaker 14.

Figure 2:
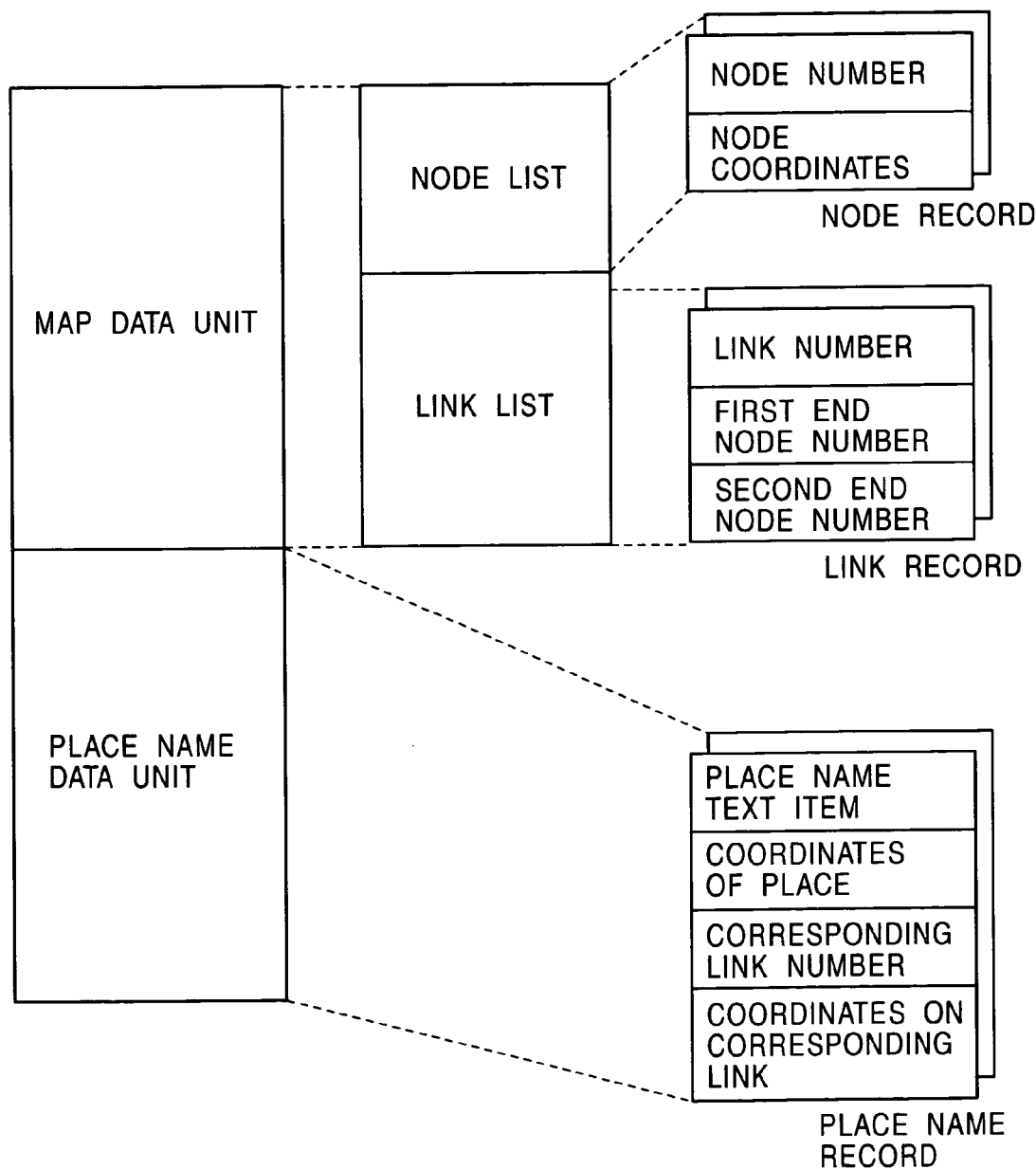
FIG. 2 is an illustration of the contents of a map database according to the embodiment of the present invention.

FIG. 2 shows map data stored in the map database 3. The map data contains a map data unit and a place name data unit.

The map data unit contains a node list and a link list. This map data unit expresses roads as linear links and endpoints of each link as nodes. The nodes are often laid on the junctions of roads, such as crossroads. The node list contains node records assigned to the nodes. Each node record has the node number and longitude and latitude coordinates of the node. The link list contains link records assigned to the links. Each link record has the link number and first and second end node numbers of the link.

On the other hand, the place name data unit contains place name records assigned to places. Each place name record has a place name text item representing the place name, the coordinates of the place, a corresponding link number indicating the nearest link to the place, and the coordinates of the nearest location to the place on the link.

In the configuration described above, the current location calculator 1 processes a provisional current location estimated from the output of the driving condition sensor 9 and the GPS receiver 10 by, for example, map matching with a map represented by the map data unit read out from the map database 3 to determine a real current location.

The main controller 5, on receipt of a request for entering a destination from a user through the input device 13, executes a process for determining the destination, which will be described below. The route search unit 2 searches the map data unit in the map database 3 for a route from the current location to the coordinates of the determined destination. The navigation screen generator 4 generates a navigation screen showing the route on a map represented by the map data unit read out from the map database 3. The display 12 displays the screen through the display controller 11.

The process for determining a destination will now be described in detail.

Figure 3:
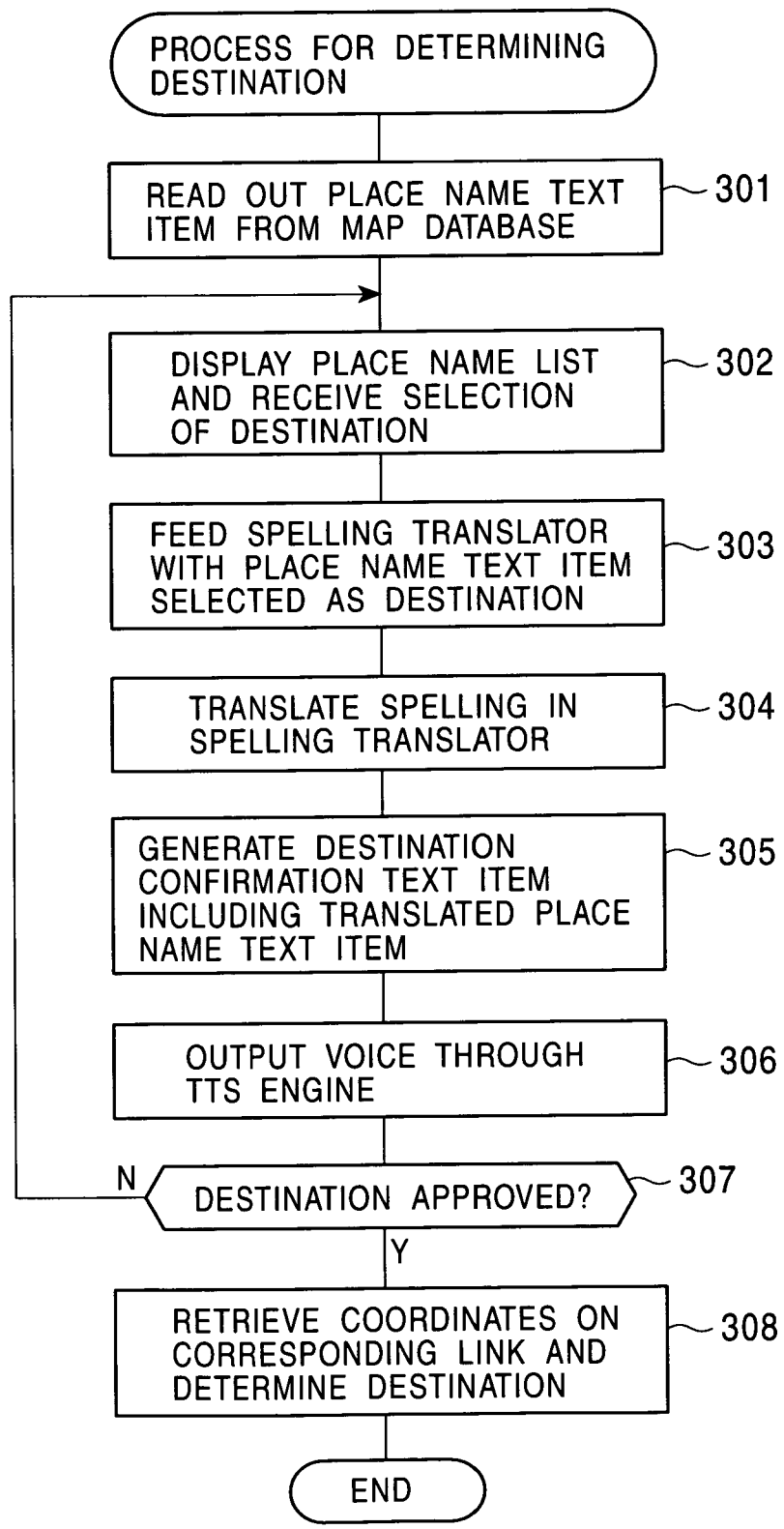
FIG. 3 is a flowchart showing a process of determining a destination in a navigation apparatus according to the embodiment of the present invention.

FIG. 3 shows the process for determining a destination. The main controller 5 reads out a place name text item stored in the place name records (Step 301). The main controller 5 then displays the place name text item in a list on the display 12 through the display controller 11 and receives a request for retrieval of a place name to be designated as a destination or selection of the place name from the displayed list through the input device 13 from the user (Step 302).

The main controller 5 feeds the spelling translator 6 with the selected place name text item (Step 303). The spelling translator 6 translates the spelling of the place name text item according to the rules described in the translation rule table 7 (Step 304). The main controller 5 then combines the translated place name text item and a predetermined text item into a confirmation text item for confirming the place name with the user, for example, "May I set 'the place name' as a destination?" and the confirmation text item is fed into the TTS engine 8 (Step 305). The TTS engine 8 converts the text item into voice, which is output from the speaker 14 (Step 306).

The input device 13 receives the input of whether or not the place name is approved as a destination from the user (Step 307). If the place name is approved, the main controller 5 determines a location from a corresponding link number and coordinates on the corresponding link in the place name record of the place name, thereby setting the location as a destination (Step 308). Otherwise, the process returns to Step 302.

FIGS. 4A, 4B, and 4C show the contents of the translation rule table 7 used for the translation of spelling of a text item in the spelling translator 6. The translation rule table 7 includes pairs of original characters or strings and translated characters or strings. That is, each pair includes an original character or string and a translated character or string. Herein the term "string" represents two or more continuous characters.

Referring to FIG. 4A, in this case, a French character or string used in, for example, Canada, and not included in the English alphabet is translated into an English alphabet character or string having a pronunciation equivalent or similar to the pronunciation of the French character or string. Referring to FIG. 4B, a German character or string not included in the English alphabet is translated into an English alphabet character or string having a pronunciation equivalent or similar to the pronunciation of the German character or string.

Referring to FIG. 4C, the abbreviation of a text item including a French character or string not included in the English alphabet is replaced with a full text item. The French character or string in the full text item is then translated into an English alphabet character or string having a pronunciation equivalent or similar to the pronunciation of the French character or string.

As described above, the navigation apparatus according to the present embodiment can produce voice corresponding to a place name including a character or string not included in the English alphabet only using the TTS engine 8 for English by translating the character or string into an English character or string, feeding the TTS engine 8 with the resultant text item, and converting the text item into voice.

This apparatus can also produce voice corresponding to an abbreviation of a place name including a character or string not included in the English alphabet by translating the character or string into an English character or string, feeding the TTS engine 8 with the resulting text item, and converting the text item into voice.

Although only the conversion of a French text item into voice with the TTS engine 8 for English is described, the navigation apparatus according to the present embodiment can also convert text items in other languages, such as Spanish, into voice with appropriate translation rule tables 7 as well as the TTS engine 8 for English. In addition, TTS engines 8 for other languages may be used to convert text items in languages not supported by the TTS engines 8 into voice.

What is claimed is:

1. An automated voice generator for generating a voice output in the pronunciation of a second language corresponding to a text item in a different first language, comprising:
   means for automatically translating a spelling of a place name of an original text item in the first language into a new text item in the second language by:
   (i) identifying each character in the original text item that is not included in the alphabet of the second language, and
   (ii) replacing only said each identified character in the original text item with a character or string in the alphabet of the second language having a pronunciation equivalent or similar to the pronunciation of the identified character in the first language; and
   a text-to-speech engine that supports the second language and not the first language, for generating voice by pronouncing the new text item according to the pronunciation of the second language.

2. The voice generator according to claim 1, wherein the original text item comprises place name text items assigned to respective places.

3. The voice generator according to claim 1, wherein the first language character and the second language character or string are included in a place name text item representing a place name.

4. The voice generator according to claim 1, wherein the first language character is in French and the second language character or string is in English.

5. The voice generator according to claim 1, wherein the first language character is in Spanish and the second language character or string is in English.

6. The voice generator according to claim 1, wherein the first language character is in German and the second language character or string is in English.

7. An automated voice generator for generating a voice output in the pronunciation of a second language corresponding to a text item in a different first language, comprising:
   means for automatically translating a spelling of a place name of an abbreviated original text item in the first language into a new text item in the second language by:
   (i) replacing the abbreviated original text item with a full text item in the first language,
   (ii) identifying each character in the full text item that is not included in the alphabet of the second language, and
   (iii) replacing only said each identified character in the full text item with a character or string in the alphabet of the second language having a pronunciation equivalent or similar to the pronunciation of the identified character in the first language; and
   a text-to-speech engine that supports the second language and not the first language, for generating voice by pronouncing the new text item according to the pronunciation of the second language.

8. The voice generator according to claim 7, wherein the first language character is in French and the second language character or string is in English.

9. The voice generator according to claim 7, wherein the first language character is in Spanish and the second language character or string is in English.

10. The voice generator according to claim 7, wherein the first language character is in German and the second language character or string is in English.

11. An automated method for generating a voice output in the pronunciation of a second language corresponding to a text item in a different first language, comprising:
   automatically translating a spelling of a place name of an original text item in the first language into a new text item in the second language by:
      (i) identifying each character in the original text item that is not included in the alphabet of the second language, and
      (ii) replacing only said each identified character in the original text item with a character or string in the alphabet of the second language having a pronunciation equivalent or similar to the pronunciation of the identified character in the first language; and
   generating voice by pronouncing the new text item according to the pronunciation of the second language, where the voice is generated by a text-to-speech engine that supports the second language and not the first language.

12. The method for generating voice according to claim 11, wherein the first language character and the second language character or string are included in a place name text item representing a place name.

13. The method for generating voice according to claim 12, wherein the first language character is in French and the second language character or string is in English.

14. The method for generating voice according to claim 12, wherein the first language character is in Spanish and the second language character or string is in English.

15. The method for generating voice according to claim 12, wherein the first language character is in German and the second language character or string is in English.

16. A navigation apparatus for guiding users, comprising:
   a map database for storing geographic information containing a place name text item representing each place name;
   means for reading out the place name text item from the map database;
   means for automatically translating the spelling of the place name text item in a first language into a new text item in the second language by:
      (i) identifying each character in the place name text item that is not included in the alphabet of the second language, and
      (ii) replacing only said each identified character in the place name text item with a character or string in the alphabet of the second language having a pronunciation equivalent or similar to the pronunciation of the identified character in the first language; and
   a text-to-speech engine that supports the second language and not the first language, for generating voice by pronouncing the new text item according to the pronunciation of the second language.

17. The navigation apparatus according to claim 16, wherein the means for translating refers to replacement rules identified in a rule table that associates a character in the first language that is not included in the alphabet of the second language with a character or string in the alphabet of the second language having an equivalent or similar pronunciation.

18. The navigation apparatus according to claim 16, wherein the means for translating operates between any of a plurality of first languages and the second language, and the text-to-speech engine supports the second language and not any of the plurality of first languages.

* * * * *